US010599725B2

(12) United States Patent
Ward et al.

(10) Patent No.: US 10,599,725 B2
(45) Date of Patent: Mar. 24, 2020

(54) SYSTEMS, DEVICES, AND METHODS FOR IMPROVED RDAP TRAFFIC ANALYSIS AND MITIGATION

(71) Applicant: VERISIGN, INC., Reston, VA (US)

(72) Inventors: Matthew Ward, Fairfax, VA (US); Andrew Fregly, Reston, VA (US); Swapneel Sheth, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 404 days.

(21) Appl. No.: 15/392,605

(22) Filed: Dec. 28, 2016

(65) Prior Publication Data

US 2018/0183829 A1    Jun. 28, 2018

(51) Int. Cl.
*G06F 16/951* (2019.01)
*H04L 29/06* (2006.01)
*H04L 29/12* (2006.01)

(52) U.S. Cl.
CPC ........ *G06F 16/951* (2019.01); *H04L 61/1511* (2013.01); *H04L 63/1441* (2013.01); *H04L 63/1458* (2013.01); *H04L 67/42* (2013.01); *H04L 61/1594* (2013.01)

(58) Field of Classification Search
CPC ............. H04L 63/1441; H04L 63/1458; H04L 61/1511; H04L 63/083; H04L 63/1425; H04L 67/42; H04L 61/1594; G06F 17/30864; G06F 16/951
See application file for complete search history.

(56) References Cited

U.S. PATENT DOCUMENTS

| | | | | |
|---|---|---|---|---|
| 10,185,761 | B2* | 1/2019 | Mahjoub | H04L 61/1511 |
| 2007/0067465 | A1* | 3/2007 | Blinn | H04L 29/12066 |
| | | | | 709/229 |
| 2012/0117239 | A1* | 5/2012 | Holloway | H04L 61/1511 |
| | | | | 709/226 |
| 2013/0318603 | A1* | 11/2013 | Merza | H04L 63/1441 |
| | | | | 726/22 |
| 2014/0373127 | A1* | 12/2014 | Thayer | H04L 63/10 |
| | | | | 726/10 |
| 2016/0127406 | A1* | 5/2016 | Smith | H04L 63/1458 |
| | | | | 726/23 |
| 2016/0234230 | A1* | 8/2016 | Rovniaguin | H04L 63/1458 |
| 2016/0337313 | A1* | 11/2016 | Wood | H04L 63/0227 |
| 2017/0041333 | A1* | 2/2017 | Mahjoub | H04L 61/1511 |
| 2017/0063881 | A1* | 3/2017 | Doganata | H04L 63/1416 |

(Continued)

OTHER PUBLICATIONS

Extended European Search Report dated May 23, 2018, European Application No. 17210932.4, pp. 1-8.

(Continued)

*Primary Examiner* — Cheng-Feng Haung
(74) *Attorney, Agent, or Firm* — MH2 Technology Law Group, LLP

(57) ABSTRACT

Improved RDAP systems, RDAP services, and RDAP methods identify users and clients and keep track of their RDAP activities. The RDAP systems, services, and methods analyze the activities of a user (or a client) and detect or determine whether or not the user is engaging in undesirable, malicious, or otherwise abnormal activities. If so, the RDAP systems, services, and methods take action to reduce, eliminate, or otherwise mitigate the undesirable, malicious, or abnormal activities of the user.

19 Claims, 4 Drawing Sheets

(56) References Cited

U.S. PATENT DOCUMENTS

2017/0195286 A1* 7/2017 Stahura ............... H04L 61/1511
2018/0115582 A1* 4/2018 Thakar ................ H04L 63/1466

OTHER PUBLICATIONS

M. Handley et al., "Internet Denial-of-Service Consideration", RFC 4732, Internet Engineering Task Force (IETF), Nov. 1, 2006, pp. 1-38.
S. Hollenbeck et al., "Security Services for the Registration Data Access Protocol (RDAP)", RFC 7481, Internet Engineering Task Force (IETF), Mar. 25, 2015, pp. 1-13.
A. Newton et al., HTTP Usage in the Registration Data Access Protocol (RDAP), RFC 7480, Internet Engineering Task Force (IETF), Mar. 25, 2015, pp. 1-16.
A. Newton et al., "Registration Data Access Protocol (RDAP) Query Format", RFC 7482, Internet Engineering Task Force (IETF), Mar. 25, 2015, pp. 1-20.

* cited by examiner

SYSTEMS, DEVICES, AND METHODS FOR IMPROVED RDAP TRAFFIC ANALYSIS AND MITIGATION

BACKGROUND

There are multiple services available for searching for information regarding registered and unregistered domain names. Among these services is a protocol called "WHOIS," that has existed since the formation of the Internet. The WHOIS protocol queries databases for owner information associated with the registrant or assignee information of registered Internet domain names in a top level domain (TLD). Initially, the Internet contained only a few TLDs such as .com, .net, and .org. As the Internet has expanded, however, many new TLDs have been added, including .gov, .edu, .cc, .tv, .jobs, and many others.

Since its creation a number of WHOIS related issues have emerged. These issues include lack of a structured format for WHOIS responses and the public exposure by WHOIS of Personally Identifying Information (PII) for registrants and other contacts associated with a registered Internet domain name. Consequently, the Internet Engineering Task Force (IETF) has generated the Registration Data Access Protocol (RDAP) specifications to address WHOIS issues and serve as a replacement for the WHOIS protocol.

The Internet Corporation for Assigned Names and Numbers (ICANN), which is the nonprofit organization that oversees the use of Internet domains, has selected the RDAP protocol for its Registration Data Directory Services (RDDS), which are required for all generic Top-Level Domain (gTLD) registries. RDDS requires the collection and display by the registry of all data associated with both the registrant of a domain name and the domain registration information. Registrant information may include PII.

An RDAP Service's primary purpose is to provide defined RDAP search and response capabilities for a constrained set of domain-related data that is defined in a search request, similar to the domain-related data that a WHOIS service provides. The constrained data could be composed of, for example, data that is relevant to specific top level domain (TLD); data relevant to IP addresses known to the RDAP service; data related to a set of entities of which the RDAP service is aware; or data related to the servers needed for operating a DNS registry, such as domain-name-server names and IP addresses.

A conventional RDAP service that is implemented according to the IETF RDAP specifications, however, has no capability to analyze the search requests that are submitted to the service relative to the identity of the entity submitting the search requests. Consequently, a conventional RDAP service also does not have any capability to improve or beneficially change its standard technical operation, e.g. its operation as specified by the RDAP protocol, in reaction to an analysis of submitted search requests associated with specific entities to identify activity patterns.

To rectify abnormal, undesirable, or malicious interactions with the RDAP service, among other reasons, it is desirable to provide systems, devices, and methods that analyze RDAP search requests and technically react to identified activity patterns in a non-standard or unconventional manner.

BRIEF SUMMARY

The present disclosure relates to systems, devices, and methods for analyzing Registration Data Access Protocol (RDAP) requests. In some cases, the system, device, or method may be implemented in the form of an improved RDAP server, or other network device or component, that includes a memory containing instructions and one or more processors, operably connected to the memory, that executes the instructions to perform new, unconventional operations. In various implementations, the operations may include: receiving an RDAP search request and a requestor identifier that identifies an entity that made the RDAP search request; analyzing one or more of records of RDAP search requests that are associated with the requestor identifier to detect an abnormal activity by the entity; and mitigating the abnormal activity that was detected. In some implementations, the operation may also include storing a record of the RDAP search request in association with the requestor identifier.

With regard to analyzing one or more of records of RDAP search requests to detect an abnormal activity by an entity, in various implementations the analyzing may be distributed to and performed by multiple services. In some implementations, the analyzing is performed periodically, while in others the analyzing is performed continuously. In various implementations, the analyzing generates data, and the data is considered in later analysis processing.

With regard to mitigating the abnormal activity that was detected, in various implementations mitigating includes controlling access to an RDAP server by the entity that performed the abnormal activity that was detected. In some implementations, the controlling is performed by the RDAP server itself, while in others the controlling is performed by a component separate from the RDAP server that can control access to the RDAP server.

In still other implementations, the present disclosure describes systems, devices, and methods for analyzing RDAP requests that perform operations including receiving an RDAP search request and a requestor identifier that identifies an entity that made the RDAP search request; storing a record of the RDAP search request in association with the requestor identifier; analyzing a plurality of records of RDAP search requests that are associated with the requestor identifier to detect an abnormal activity by the entity; and mitigating the abnormal activity that was detected. In some variations, the operation for mitigating the abnormal activity includes conventionally processing only a limited number of RDAP search requests from the entity during a predetermined time period. In some variations, the operation for mitigating the abnormal activity includes ceasing to conventionally process RDAP search requests from the entity.

In various implementations, the entity that made the RDAP search request may be a human user, and the requestor identifier identifies that human user and/or the entity that made the RDAP search request may be an RDAP client, and the requestor identifier identifies that RDAP client. In various implementations, the requestor identifier is, or is information from, a security token.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
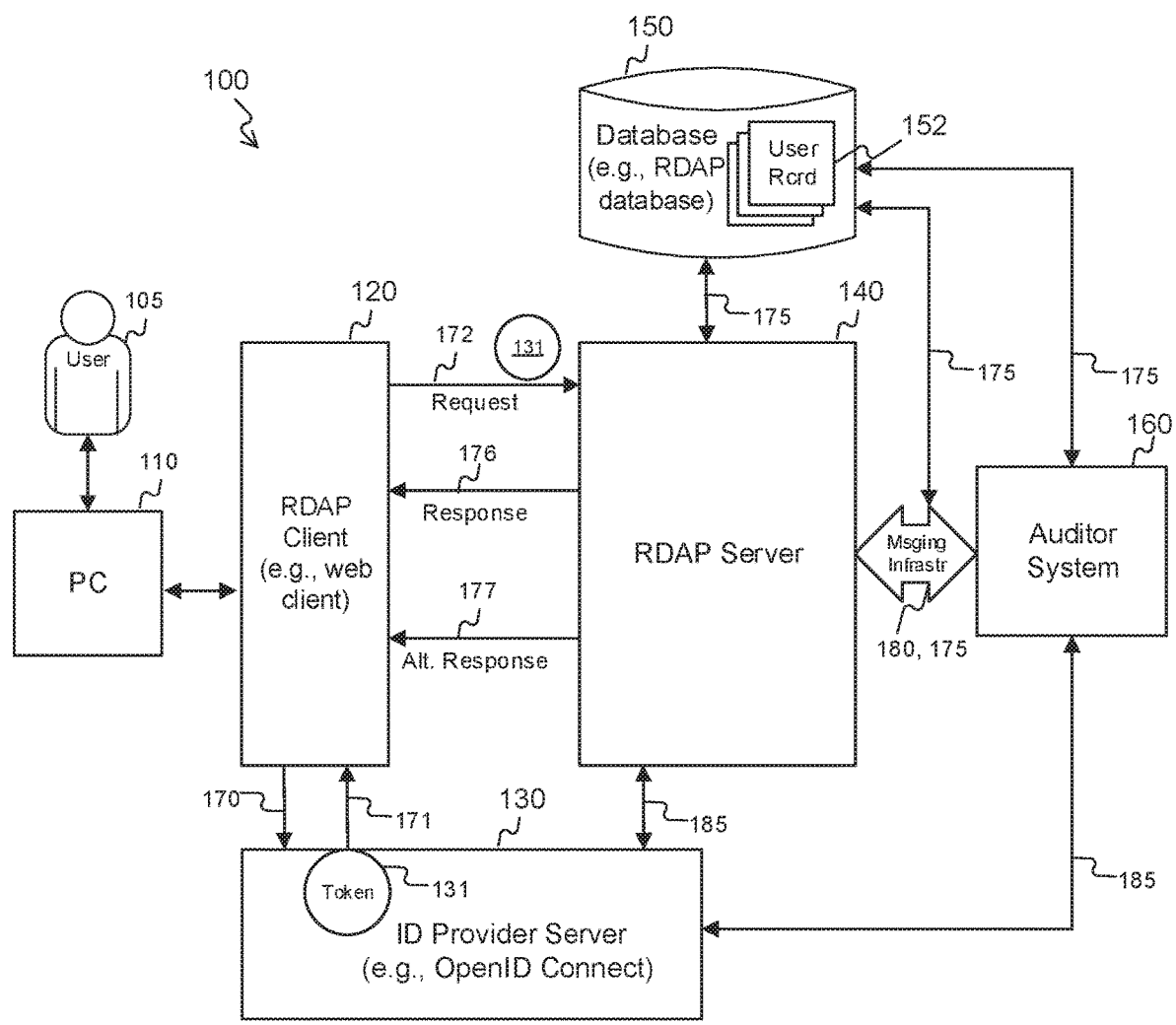
FIG. 1 is a block diagram illustrating an example of an improved RDAP system, consistent with certain disclosed embodiments.

The following detailed description refers to the accompanying drawings. Wherever convenient, the same reference numbers are used in the drawings and the following description to refer to the same or similar parts. While several examples of embodiments, implementations, and features of the present disclosure are described herein, modifications, adaptations, and other implementations are possible, without departing from the spirit and scope of the present disclosure. Accordingly, the following detailed description does not limit the present invention. Instead, the proper scope of the invention is defined by the appended claims.

FIG. 1 is a block diagram illustrating an example of an improved RDAP system 100, consistent with certain disclosed embodiments. As shown in the example of FIG. 1, the system 100 includes an RDAP computing system or server 140, an RDAP client 120, and an ID Provider Server 130, which are communicably connected to each other, for example via a network (not shown), such as the Internet.

In various implementations, the RDAP server 140 may be one or more computing devices that provide the improved RDAP service described herein. In various embodiments, the RDAP server 140 can be implemented by one or more database servers, web servers, mainframe computers, etc. used to provide the improved RDAP service. Accordingly, the RDAP server 140 can receive RDAP search requests 172 (e.g., requests for information regarding the registrant and/or registrar of a specified domain or website) and transmit or provide conventional RDAP responses 176 (e.g., responses containing the requested RDAP information). In the example shown, the RDAP server 140 may also transmit or provide alternative responses 177, which are not part the conventional technical operation of the RDAP server 140 as specified by the IETF RDAP specifications, and the RDAP server 140 may in some mitigation situations provided no response at all to an RDAP search requests 172, contrary to the conventional technical operation of an RDAP service/server.

In various implementations, the RDAP client 120 may be one or more computing devices. For example, the RDAP client 120 can be implemented as a Web application, or as an application running natively on a computing device, or may be implemented as a web application program interface (API) or as a web service by one or more database servers, web servers, mainframe computers, etc. used to provide an RDAP client service. Accordingly, the RDAP client 120 can generate, send, or transmit RDAP search requests 172 (e.g., requests for information as described in RDAP specifications, such as information regarding the registrant and/or registrar of a specified website) to the RDAP server 140 and receive conventional RDAP responses 176 (e.g., responses containing RDAP responses as described in RDAP specifications) from the RDAP server 140. In the example shown, the RDAP client 120 may also receive alternative responses 177 from the RDAP server 140 which are not described in RDAP specifications, which the RDAP client 120 may or may not recognize as unconventional responses.

As shown, the RDAP client 120 may also interact with a user 105, for example via an application or browser executing on a personal computer (PC) 110 of the user 105. The user 105 may interact with the RDAP server 140 via the RDAP client 120, and the user 105 may thus submit RDAP search queries (e.g. 171) to the RDAP client 120 and receive RDAP responses (e.g. 176, 177) from the RDAP client 120.

In various implementations, the Identification or Identity (ID) Provider Server 130 may be one or more computing devices. For example, the ID Provider Server 130 can be implemented as a web application or may be implemented as a web application program interface (API) or as a web service by one or more database servers, web servers, mainframe computers, etc. used to provide an ID provider service, which may be a federated ID provider service or other ID provider service as known in the art. The ID provider service of the ID Provider Server 130 allows the RDAP Server 140 to determine the identity of the user 105 who is using the PC 110 to make RDAP search requests 172 via the RDAP client 120 to the RDAP Server 140. An example of a suitable ID provider service is the OpenID Connect service (see, www.openid.net), which can be used to implement federated authentication as contemplated in IETF RFC 7481, which is entitled "Security Services for the Registration Data Access Protocol (RDAP)".

In various embodiments, the ID Provider Server 130 may provide identifiers (e.g., a security token 131) for users (e.g., the user 105) who wish to interact with the RDAP server 140, may affirm to the RDAP server 140 that the identifier presented by a user is known to the ID Provider Server 130, and may provide other information about the user that is known to the ID Provider Server 130.

More specifically as shown in the example of FIG. 1, the user 105 provides information 170 to the ID Provider Server 130, which typically verifies or validates some or all of the information, and which creates and issues 171 the token 131 to the user 105 or the RDAP Client 120, as is known in the art. In various implementations, the RDAP client 120 may also, or alternatively, obtain and use a token 131 for itself. In various implementation, the RDAP Server 140 may also, or alternatively, obtain and use the token 131 for itself and also may transmit the token to RDAP Client 120 to use in search requests. In various implementations, one or more token 131 is included with or in the RDAP search request 172 initiated by the user 105. Upon receipt of the RDAP search request 172, the RDAP server 140 may validate the token 131 by various means including cryptographically verifying a digital signature of the ID Provider Server 130 on the token 131, and if validated, the RDAP server 140 may trust the information describing the user 105 (and/or the RDAP client 120) that is contained in the token(s). Thus, the RDAP server 140 uses the token 131 provided by the ID Provider Server 130, (which may be part of a federated authentication system), to provide authentication and access to the RDAP system and for identification of users and/or RDAP clients. Although the example of FIG. 1 depicts the user 105 interacting with the ID Provider Server 130 via the RDAP client 130, in other implementations the user 105 may interact directly with the ID Provider Server 130 via the PC 110 to receive the token 131.

As shown in the example of FIG. 1, the RDAP server 140 is also operably connected 175 to a database or data store (database) 150. This Database may be an RDAP database that contains conventional RDAP-related data or information, such as the name and contact information of the registrant who owns a domain, the name and contact information of the registrar that registered the domain name, and the registration dates, the name servers, the most recent update, and the expiration date for the domain. The database 150 may also be separate from the RDAP Database containing conventional RDAP-related data or information. The database 150 may contain additional information associated with the improvements described herein, such as user request records 152.

In various implementations, the user request records 152 may be created by the RDAP server 140 or some other component that has access to the user identity, including the RDAP Client and the ID Provider Server, and each user request record 152 may store or save data or information from, related to, or associated with the RDAP search request(s) 172 made by a specific user 105 and/or by a specific RDAP client 120.

Thus, the RDAP Server 140 or any other component with access to the user identity and RDAP requests may collect data from or related to each RDAP request 172, such as a request's originating IP address, Autonomous System (AS) ID, time-of-day, query text, query result meta-data, and query processing meta-data. In addition, the RDAP Server 140 or other component with access to user identity and RDAP requests may collect data related to the requestor (e.g., the user 105 that initiates the RDAP search request 172), such as in data from or related to the security token 131 associated with an RDAP request. And, the RDAP Server 140 or other component with access to user identity and RDAP requests may store the data from or related to each RDAP request in association with the data related to the requestor, such that the RDAP Server 140 or other component can identify the user and/or RDAP client that made each request.

In some implementations, the data related to the requestor may come from the token 131, which may include one or more "claims," where each claim is a statement or representation the subject (e.g., the user 105 or the RDAP client 120) makes about itself or another subject, or is some statement or representation about the subject by the ID Provider Server 130. In other words, the claims associated with a token 131 contain information about or describing the subject (e.g., the user 105) and provided by the ID Provider Server 130 that created the token 131. Examples of this include the claims found in a Security Assertion Markup Language (SAML) authentication token, an OpenID Connect identity token, or an OAuth 2 access token.

In various embodiments, the token 131 may contain, provide access to, or otherwise be associated with the claims shown below in Table 1, among others.

TABLE 1

| TOKEN CLAIM | DESCRIPTION |
| --- | --- |
| Subject | Unique identifier for an authenticated entity |
| Name | Given name(s) or first name(s) of the end-user who was authenticated |
| Email Address | Email address associated with "Subject" |
| Locale | Location associated with "Subject" |
| Time Zone | Time zone associated with "Subject" |
| Phone Number | Preferred phone number for "Subject" |
| Address | Preferred address for "Subject" |
| Authorization Claims | Authorizations that have been granted to "Subject" |
| Language | Language preferences of the request, in priority order |

In various embodiments, the RDAP Server 140 or other component with access to token 131 may save or store the token 131 and/or information, such as claims, associated with the token 131 in the database 150, for example, in a user data record 152 associated with the subject of the claims of the token 131. The RDAP Server 140 or other component with access to the token 131 or the user data records 152 may use the information associated with the token 131 to identify the activities initiated by a particular user, e.g., the requests 172 initiated by the user 105, and to perform responsive actions that may be specialized for that particular user, such as mitigating actions. The RDAP Server 140 may use the claim information associated with the token 131 as input in determining what level of access to RDAP data is to be provided.

In various embodiments, the RDAP Server 140 or other component with access to the user records 152 may use the information from the token 131 of a user 105 to index, look up or access information in the database 150 about the actions (e.g. the requests 172) of the user 105, which may be contained in the user record 152 for the user 105. The RDAP Server 140 or other component with access to the user records 152 may also perform usage analytics of the looked-up user records 152, which reflect the request history of each user 105, and may identify characteristics of activities related to user 105, such as:

Identification of undesirable or malicious RDAP clients;
Identification of undesirable or malicious RDAP users;
Analysis of entities being searched for over time;
Generation of domain interest-level indicators;
Identification of patterns related to RDAP searches that can be correlated with domain name sales over periods of times or within locales;
Correlation of RDAP searches with significant events in the domain name life cycle;
Understanding RDAP usage patterns based on characteristics (e.g., claims) of the subjects that are performing RDAP searches, such as locale, authorizations, and the like; and
Correlation of RDAP user characteristics and behavior relative to domain name purchases and renewals.

In various implementations, the improved RDAP Server 140 or other components with access to search-related data may perform novel RDAP usage analytics (usage analytics) on search-related data (e.g., the user data records 152) to identify users 105 (or other entities) and/or RDAP clients 120 that are engaging in malicious, abusive, undesirable, or abnormal activities in interacting with the RDAP Server 140. The improved RDAP Server 140 or other components with access to search-related data may also perform novel mitigation operations in response to or based on the output of the usage analytics.

In operation, an RDAP service as implemented by the RDAP Server 140 may be subjected to a variety of undesirable types of search activities that degrade the performance of the RDAP Server 140. One such undesirable type of search activity is a Denial of Service (DoS) attack, where one or more requestor floods the RDAP server 140 with an undesirably large amount of query traffic and/or bombards the RDAP server 140 with abnormally complex queries. Processing these requests requires an abnormally large amount of resources, degrades and slows a conventional RDAP server's ability to service legitimate requests, and may even crash a conventional RDAP server. Various implementations of the disclosed improved usage analytics may identify entities (e.g., user 105) instigating the DoS-attack RDAP search requests 172 and/or identify the RDAP client instances (e.g., RDAP client 120) used to submit the DoS-attack RDAP searches and provide new attack-mitigation capabilities for the RDAP server 140. The improved usage analytics may also record information that would be useful for prosecution of the DoS-attack perpetuators, for example in the user records 152.

Various implementations of the disclosed usage analytics can also identify the entities (e.g., user 105) that misuse the information supplied by the RDAP Server 140, such as data miners that scrape all of the publically accessible RDAP-related data from the database 150, and provide new scraping-mitigation capabilities that are not provided by a conventional RDAP server.

For a specific example with respect to a DDoS attack, the improved usage analytics may identify RDAP clients 120 that are performing (or have performed) undesirably large quantities of searches, as identified or determined by surpassing a threshold number of searches during a given time period. To perform this analysis, the number of RDAP search requests 172 associated with a specific identified user 105 and received 120 within a ten-minute period may be counted (by, for example, the RDAP server 140), and if the count exceeds the predetermined threshold number of 100, then the RDAP Server 140 may change its normal operation and instead operate in a remedial or mitigating mode when processing requests 172 associated with the identified user 105. In some implementations of a remedial or mitigating mode, the RDAP Server 140 may cease to conventionally process requests 172 associated with identified user 105 and may instead respond with an error message in an alternative response 177, or the RDAP Server 140 may send an alert to a network operations controller (not shown) that instigates reconfiguration of network hardware to block access to the RDAP Server 140 from the IP address(es) of the RDAP Client(s) 120 associated with the identified user 105. In some implementations, mitigation may include the RDAP Server 140 interacting over an interface 185 with the ID Provider Server 130 so that it will performing mitigation functions against the identified user 105, such as revoking or marking as invalid the token 131 associated with the user 105.

Usage analytics may identify the user(s) 105 that initiated or submitted the undesirable searches by, for example, analyzing the "subject" claim or "email address" claim found in the identity token 131 associated with the identified undesirable search requests 171. In some implementations, the RDAP Server 140 may then initiate remedial or mitigating action for all subsequent RDAP search requests 172 received from that identified user 105. For example, the RDAP Server 140 may cease processing requests 172 from the identified RDAP service user 105 and instead may respond with an error message in an alternative response 177, or the RDAP Server 140 may send an alert to network operations controller (not shown) that instigates reconfiguration of network hardware to block access to the RDAP Server 140 from the IP address(es) of the RDAP Client(s) 120 associated with the identified user. In some implementations, mitigation might include the RDAP Server 140 interacting 185 with the ID Provider Server 130 so that it will perform mitigation functions against the identified user, such as setting up or reconfiguring router or firewall rules to block requests from the identified RDAP clients from reaching the RDAP server 140.

For a specific example with respect to scraping, the usage analytics (as executed, for example, by the RDAP server 140) may identify a user 105 that is issuing (or has issued) query requests 172 that result in the user 105 retrieving a large amount (or a majority of substantially all) of the RDAP data known to the RDAP server 140. This practice may be considered abusive or undesirable because the user 105 may be mining the RDAP data for PII, such as the email addresses and other contact information of domain owners, and using the PII for spam or unwanted marketing. To perform this analysis, the usage analysis may count or calculate the number of RDAP search requests 172 for different domains that have been received from the same user 105 in some given period of time. If the number of RDAP search requests 172 received from the same user 105 exceeds a threshold percentage, such as 50%, of the total number of domains serviced by the RDAP Server 140 during the specified period, such as five minutes, then the RDAP Server 140 may change its normal operation and operate in a remedial or mitigating mode when processing requests 172 from the identified user 105. In some implementations, in mitigating mode, the RDAP Server 140 may cease processing requests 172 from the identified user 105 and instead respond with an error message in an alternative response 177. For another example, the RDAP Server 140 may send an alert to network operations that instigates configuration of network hardware to block access to the RDAP Server from the IP addresses of RDAP Clients associated with the identified user if the CPU load of the RDAP Server exceeds 75% and the identified user is associated with more than 25% of the RDAP requests received in a one minute time period. In some implementations, mitigation might include the RDAP Server 140 interacting 185 with ID Provider Server 130 so that it will performing mitigation functions against the identified user. The request numbers, time periods, CPU load percentages, percentages of requests and the like used in the examples throughout this description are illustrative, and do not necessarily represent the minimum, maximum, or optimal values.

In various implementations, the analyzing of the RDAP requests 172 and their associated token 131 (or other requestor identifier) may be distributed among and performed by two or more services, devices, servers, or systems. In some such implementations, other system(s), for example an Auditor System 160, may receive and store user records 152 and perform usage analytics separate from and/or instead of any usage analytics performed by the RDAP Server 140. For example, the Auditor System 160's usage analytics may result in reports or alerts related to usage patterns identified by the usage analytics. These reports or alerts may be sent to the RDAP Server 140 or some other service. The Auditor system 160 may receive and store user records related to RDAP activity for a plurality of RDAP Servers 140. The Auditor Server 160 may perform usage analytics on these user records 152 to identify abnormal or undesirable activity patterns that involve multiple RDAP Servers 140. For example, such usage analytics could identify a user 105 who is distributing RDAP requests sequentially against a set of RDAP Servers such that no single RDAP service running usage analytics would notice abusive, undesirable or otherwise abnormal behavior, but the aggregate activity against all the RDAP servers would be identified as such behavior.

The system 100's use of security tokens 131 to identify the users 105 and the RDAP clients 120 of the RDAP server 140 allows usage analytics that produce use and access statistics on a per-RDAP-Server 140 basis and also allows for auditing and analysis of the use and access statistics gathered from multiple RDAP server instances (not shown).

One of ordinary skill will recognize that the system 100 depicted in FIG. 1 is simplified for ease of explanation and clarity of understanding. The system 100 may have components, functions, connections, and operations added, removed, combined, or modified without departing from the principles of the invention. For example, in various implementations, there may be multiple users 105 interacting with each RDAP client 120, and there may be multiple RDAP clients 120 interacting with each RDAP server 140, and there may be multiple RDAP servers 140. For another example, the user records 152 may be stored somewhere other than the database 150, such as in the local storage of the RDAP server 140. For yet another example, the RDAP data may not be stored in a separate database 150 as shown, but instead may be store in the local storage of the RDAP server 140. Many other variations are possible within the scope of this disclosure.

Figure 2:
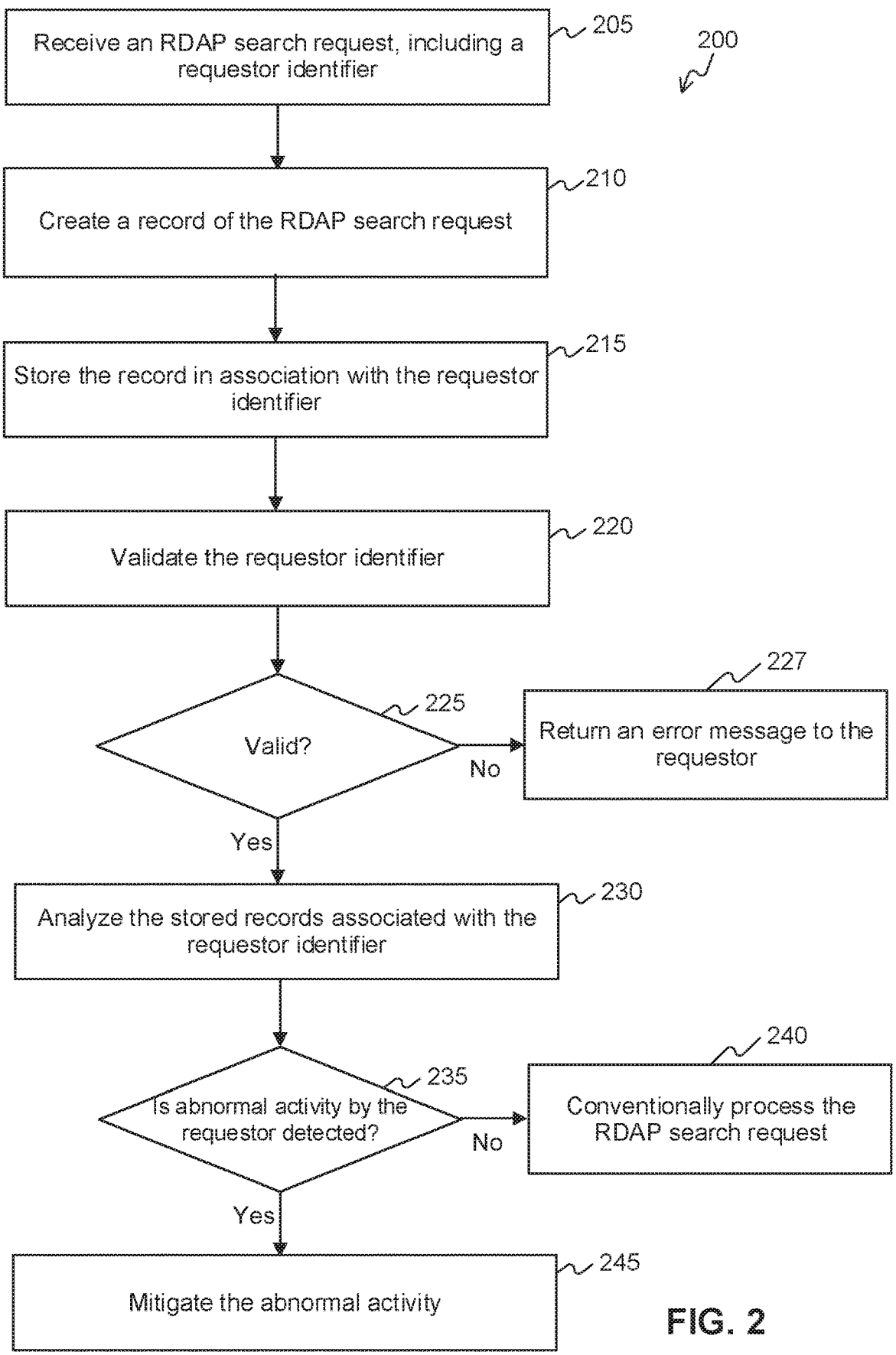
FIG. 2 is a flow chart illustrating an example of a process for processing RDAP requests, consistent with certain disclosed embodiments.

FIG. 2 is a flow chart illustrating an example of a process 200 for processing RDAP requests, consistent with certain disclosed embodiments. In various implementations, the method 200 may be performed by an improved RDAP service or server, such as the RDAP server 140 in the system 100, as shown in FIG. 1.

In the example shown, the process 200 begins at operation or stage 205 with receiving an RDAP search request (e.g., a request 172). In some implementations, the RDAP search request may include a requestor identifier, such as an identifier that was created by an ID Provider Server 130 during authentication of a user 105 or an RDAP client 120. For example, the requestor identifier may be a security token 131 that identifies the user 105 that originated the RDAP search request 172. Alternatively or in addition, the requestor identifier may be a security token(s) 131 that identifies the RDAP client 120 that transmitted the RDAP search request 172. In various implementations, the requestor identifier may be part of or attached to the received RDAP search request or may be received separately from the RDAP search request.

The process 200 then creates a record of the RDAP search request (stage 210). In various instances, the RDAP Server 140 may implement this stage by collecting or creating information describing or representing the received RDAP search request 172, or by copying the RDAP search request 172 itself. In various implementations, the creation of a record of an RDAP search request may be done at another point in the process 200 after the search request and associated requestor identifier are verified or validated.

At stage 215, after creation of a record of the RDAP search request, the process 200 stores the record of the RDAP search request in association with the requestor identifier, for example in the database 150. In various implementations, a messaging infrastructure 180 may be used to transmit the record of the RDAP search request to the database 150. The messaging infrastructure 180 may accomplish this with a synchronous transfer mechanism, or may accomplish this with an asynchronous transfer mechanism. Once stored, the record may be read or otherwise accessed based on its associated requestor identifier, such as the security token 131 or information from the token 131. Thus, data related to RDAP search requests and RDAP user activity may be stored, retrieved, and accessed using requestor identifier information (e.g., a token claim, such as "subject," from Table 1) to locate the relevant record(s) in the database 150.

At stage 220, the process 200 then validates the requestor identifier. In various implementations where the requestor identifier is a security token, the RDAP server 140 may verify the token by cryptographically verifying the digital signature of the token's ID provider (e.g., ID provider 130) on the security token.

At stage 225, the process branches according to whether the requestor identifier is valid or not, according to the requestor identifier validation or verification of stage 220. If the requestor identifier is not valid (stage 225, No), then the process returns an error message to the requestor (stage 227) and ends without providing the requested RDAP search results. In various implementations, however, the invalid request is still logged and stored as a record for future analysis and potential auditing. In various implementations, the error message sent by stage 227 may be contained in an alternative response 177 to the RDAP search request 172, as shown in FIG. 1.

If, on the other hand, the requestor identifier is valid (stage 225, Yes), then at stage 230 the process 200 analyzes the stored activity records associated with the requestor identifier to detect, identify, deduce, or otherwise determine that there was abnormal or undesirable activity by the requestor (e.g., the user 105). In some embodiments, stage 230 may employ one or more tests and/or algorithms to determine whether the requestor is acting in an undesirable, malicious, or abnormal manner, such as by acting to initiate requests 172 of a type, volume, and/or frequency that do or may significantly degrade the performance of the RDAP Server 140, (e.g., a DoS attack). For example, analysis during this stage might identify a series of requests all of which are associated with the same requestor identifier and which occur within a 10 second time frame, and which occur at a frequency of more than 10 per second, as being a denial of service attack. In some embodiments, stage 230 may employ one or more tests and/or algorithms to identify a series of requests that are likely to be data mining or data scraping by the requestor. For example, analysis might identify a series of 100 or more requests, which are related to different domain names, which occur within a 10 minute period, and all of which are associated with the same requestor identifier, as being data mining or data scraping.

Another type of undesirable or abnormal activity that the analysis stage 230 may detect is an unauthorized access attack in which a malicious requestor (e.g., the user 105) masquerades as a legitimate user that has a higher authorization level than the malicious user, which could allow the malicious user to gain access to RDAP information that they are not entitled to see, such as PII. To detect such unauthorized access activity, stage 230 may analyze a series of RDAP searches to identity suspicious interaction patterns, such as by detecting RDAP Client identifiers known to be associated with malicious requestors, or by detecting a series of queries that in aggregate do not seem to have a legitimate purpose.

In various implementations, analysis processing may be a continuous or near real-time process. Various methods may be used for continuous or near real-time analysis. In some embodiments, database triggers may be used to execute analysis algorithms as activity records are put into the database 150. In some embodiments, a process which periodically polls the database 150 for new or updated activity records may trigger analysis processing. In some embodiments where the messaging infrastructure 180 is used to transmit activity records, analysis processing may be continuously performed to take into account activity records flowing through the messaging infrastructure 180. In some embodiments, analytic data may be generated that then becomes input into additional analysis processing. For example, analytic data may flag a domain name that is associated with the IP address used by an abusive RDAP client 120. Future analytics that are evaluating whether or not another RDAP client is engaged in abusive activities might then detect that the IP address of the RDAP client is associated with the flagged domain and consequently determine that the RDAP client is engaged in abusive activities.

At stage 235, the process 200 branches depending on whether or not abnormal activity was detected by the analysis of the requestor's activities in stage 230. If the process 200 did not detect any abnormal activity (stage 235, No), then the process 200 processes the RDAP search request in a conventional manner (stage 240), such as by sending a response 176 containing the requested RDAP information to the user 105 (requestor), as is known in the art, and then the process 200 ends.

If, on the other hand, the process 200 detected abnormal activity (stage 235, Yes), then the process mitigates the abnormal activity (stage 245) and ends. In some implementations, the RDAP server 140 may mitigate a requestor's (e.g., user 105) abnormal activity by ceasing to process or ignoring the RDAP search requests 172 from that requestor 105, where the RDAP server 140 identifies the appropriate requests according to the requestor identifier (e.g., token 131) associated with each request 172. In some such implementations, the RDAP server 140 may simply send no responses 176 or 177 to the requests 172 from that requestor 105 as a form of mitigation. In other such implementations, the RDAP server 140 may send one or more non-standard, alternative responses 177 to the requests 172 from that user 105, where the alternative responses 177 may contain an error message or the like instead of the requested RDAP information.

In some implementations of mitigation, the RDAP Server 140 may send an alert to a network operations controller that instigates configuration of network hardware to block access to the RDAP Server 140 from the IP address of an RDAP Client 120 that is associated with the user associated with the detected abnormal activity. In some implementations, mitigation might include interacting 185 with an ID Provider Server 130 so that it will performing mitigation functions against the requestor.

One of ordinary skill will recognize that the process 200 depicted in FIG. 2 is simplified for ease of explanation and clarity of understanding. The process 200 may have stages, functions, and operations added, removed, combined, reordered, looped, performed in parallel, or modified without departing from the principles of the invention. For example, process 200 may be modified to substitute "RDAP client identifier" for "requestor identifier," such that the process detects abnormal activity on the part of a specific RDAP client and mitigates that RDAP client's activity, such as by reacting in an unconventional manner to its RDAP requests (e.g., ignoring them). Many other variations are possible within the scope of this disclosure.

Figure 3:
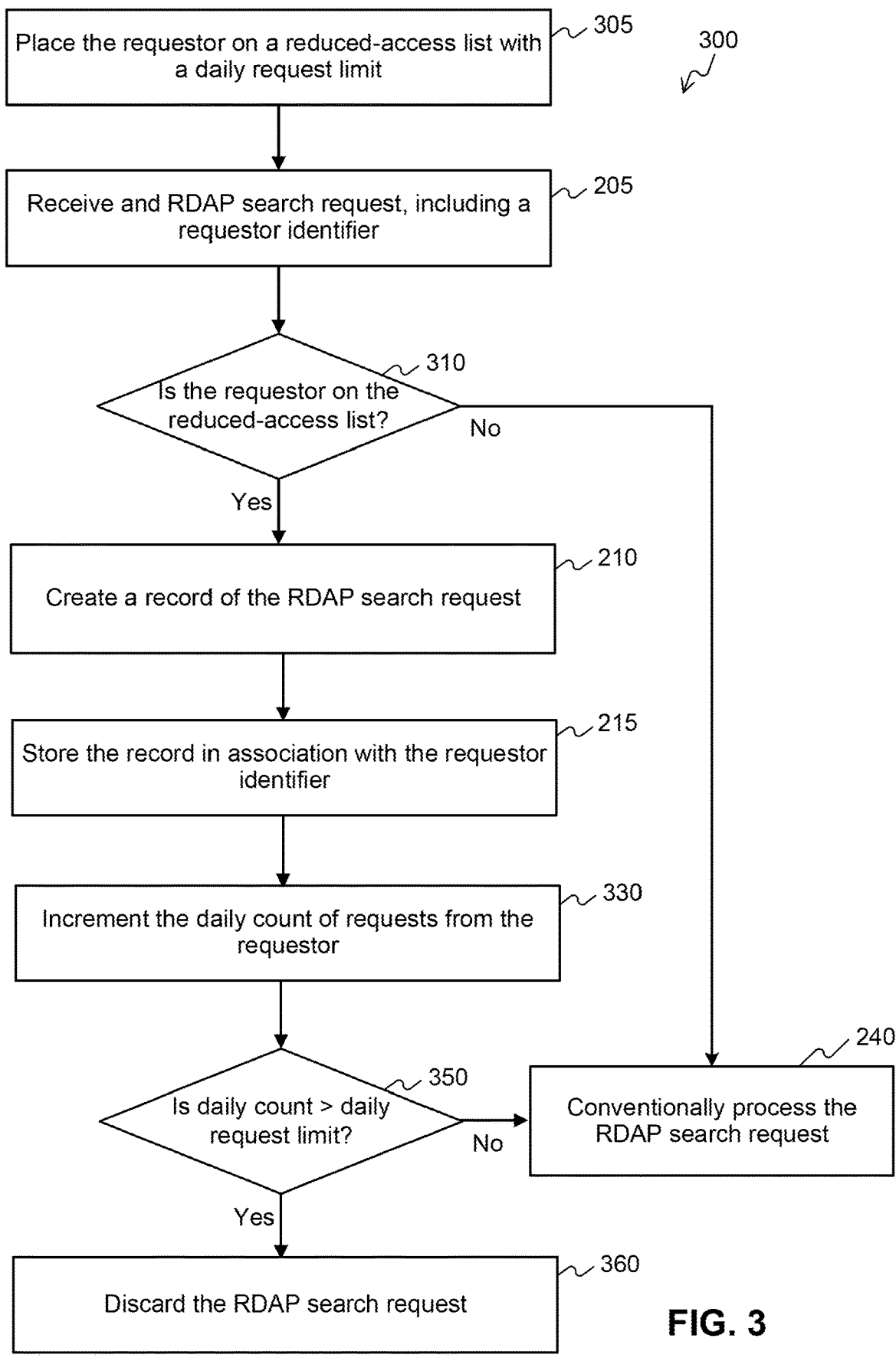
FIG. 3 is a flow chart illustrating an example of a process for mitigating abnormal RDAP activities, consistent with certain disclosed embodiments.

FIG. 3 is a flow chart illustrating an example of a process 300 for mitigating abnormal RDAP activities, consistent with certain disclosed embodiments. In various implementations, the method 300 may be performed by an improved RDAP service or server, such as the RDAP server 140 in the system 100, as shown in FIG. 1.

In various embodiments consistent with this disclosure, the process 300 may be one example of a possible implementation of stage 245, "Mitigate the abnormal activity," of the process 200 of FIG. 2 with respect to a requestor/user 105 that is detected, deduced, or classified as performing undesirable RDAP scraping activities in stages 230 and 235. Other implementations consistent with this disclosure may combine some or all of the stages of the processes 200 and 300 into a single process.

The process 300 begins at operation or stage 302 with placing a requestor who has initiated undesirable or abnormal activity onto a reduced-access list, which in this example includes a request limit for some given time period. In some embodiments, the given time period could be a daily request limit. In various implementations, this stage may include adding information identifying the requestor, (such as the contents of the "subject" claim (see Table 1) from the requestor's token 131), to the reduced-access list. This stage may also include entering in the reduced-access list a predetermined number that indicates the daily request limit for that requestor in association with the information identifying the requestor. In various implementations, the daily request limit indicates the maximum number of RDAP search requests 172 from the requestor that the RDAP Server 140 will process per day. Thus, the requestors listed on the reduced-access list may only request and receive a limited amount of information from the RDAP Server 140 each day. Their access to the RDAP services is restricted or reduced, which prevents them from scraping or obtaining significant quantities of RDAP data in a short time period.

As noted with regard to FIG. 2, various algorithms may be employed to detect undesirable or abnormal activity that results in placing a requestor on the reduced-access list. Some algorithms may detect abnormal computing resource usage and trigger a mitigation action to restrict computing resources used in fulfilling requests. Some algorithms may analyze RDAP search activity from multiple RDAP Servers to detect undesirable of abusive activity distributed across the RDAP Servers. Some algorithms may detect undesirable activity from entities that it has determined are associated with each other, such as a group of cooperating or bot users or a group of RDAP clients.

At stage 205 the process 300 receives an RDAP search request (e.g. request 172), which includes a requestor identifier. In various implementations, the requestor identifier may be a security token 131 that includes information identifying the user 105 that originated the RDAP search request 172; i.e., the requestor. In various implementations, the requestor identifier may be part of or attached to the received RDAP search request or may be received separately from the RDAP search request.

At stage 310, the process 300 branches according to whether the requestor is on the reduced-access list. In various implementations of this stage, the RDAP server 140 may extract specific information from the requestor identifier (e.g., extract the "subject" identifier from the token 131) and then search the reduced-access list for matching information identifying the requestor (e.g., for a matching "subject" identifier) in order to make this determination.

If the requestor is not on the reduced-access list (stage 310, No), then the process 300 processes the RDAP search request in a conventional manner (stage 240), such as by retrieving the requested RDAP information from the database 150 and sending a conventional response 176 containing the requested RDAP information to the user 105 (requestor), as is known in the art, and the process 300 then ends.

If, on the other hand, the requestor is on the reduced-access list (stage 310, Yes), then the process creates a record of the RDAP search request (stage 210), for example as described above with respect to FIG. 2, and at stage 215, the process 300 stores the record of the RDAP search request in association with the requestor identifier, for example as described above with respect to FIG. 2.

In the example shown at stage 330, the process 300 increments a count of RDAP requests received from the requestor for the current period. In various implementations where periods are of one day duration, the RDAP server 140 may reset this daily count to zero each day at the same time, for example at midnight.

The process 300 then branches according to whether or not the count is greater than a request limit for the requestor (stage 350) for the current time period. As noted above, in various implementations the RDAP server 140 may have previously stored the daily request limit in the reduced-access list in association with the information identifying the requestor, where the reduced-access list is a list of requestors who have been identified as conducting abusive, undesirable, or otherwise abnormal activities. If the daily count is less than or equal to the daily request limit (stage 350, No), then the process 300 processes the RDAP search request in a conventional manner (stage 240) and then ends. Thus, the process 300 conventionally processes only a limited number of RDAP search requests from the abnormally acting requestor during a predetermined time period, which is one day in this example.

If, on the other hand, the daily count is greater than the daily request limit (stage 350, Yes), then the process 300 discards the RDAP search request (stage 360) and then ends. Thus, an RDAP server 140 that implements the process 300 ceases to process RDAP search requests from a reduced-access-listed user 105 after the reduced-access-list daily request limit is reached.

One of ordinary skill will recognize that the process 300 depicted in FIG. 3 is simplified for ease of explanation and clarity of understanding. The process 300 may have stages, functions, and operations added, removed, combined, reordered, looped, performed in parallel, or modified without departing from the principles of the invention. For example, in some implementations, stage 310 may be moved to immediately before stage 350, such that the process 300 logs all activity regardless of whether or not the request is subject to unconventional processing. For another example, in some implementations, stages 210 and 215 may be removed. For another example, stage 360 may be changed to also send an alternative response 177 to the requestor, such as an error message, in addition to discarding the request. For yet another example, the process 300 may be modified to substitute "client identifier" for "requestor identifier," such that the process mitigates (e.g., unconventionally limits) the activities of RDAP clients. For yet another example, stages 330 and 350 may be eliminated so that the process 300 does not process or respond to any RDAP requests 172 that originate from users 105 that are on the reduced-access list. In this example, the reduced-access list is in effect a black list that denies access to RDAP services by the listed entities, which may be an appropriate way to mitigate the activities of DoS attackers or other malicious users. Many other variations are possible within the scope of this disclosure.

As noted previously in this disclosure, the improved RDAP services and servers 140 according the present disclosure may analyze search request activity data to provide other new, unconventional capabilities and functions in addition to identifying and mitigating undesirable users and activities. For example, the improved RDAP services and servers 140 may analyze time-based search data to correlate an interest in the searched-for domains with events that are happening in the world. Both the terms being searched for and the search results would be significant. This may also include analyzing searches that did not produce any matches.

For another example, analysis and granular reporting on the searches against specific domains will give domain investors insight to use in determining domain name valuations. The result of this analysis may be represented as an interest level indicator.

For another example, analysis that correlates searches with specific domains or classes of domains over time can be useful in identifying relationships between interest indicators and a domain name's sale/renewal likelihood.

For yet another example, trends related to marketing activities and other locale-specific business activities may be detected by an analysis correlating the search-related data indicative of locales. Correlating the locale and/or identity of the entities performing the searches can indicate the effectiveness of locale-specific marketing campaigns. Correlating domain names for websites associated with a locale can indicate interest in the locale and possibly inspire marketing approaches within the locale.

For yet another example, analysis for correlating the frequency and types of searches during a domain's life cycle can support renewal, deletion, and repurchase forecasting for the domain.

For still another example, the RDAP service may perform analysis for correlating the characteristics of the entities performing searches with the search characteristics. The claim information found in an identity token or an authorization token can be analyzed to determine trends related to the characteristics of the claim values. For instance, the search traffic from entities with an email address from a Chinese email provider could be correlated with the categories of domains being searched for. This could serve as an indicator of evolving interests and opportunities in China.

For still another example, the RDAP service may perform analysis for the correlation of the characteristics of the entities performing the searches relative to the domain name's purchase and/or renewal. The claims in an identity token or an authorization token can be analyzed to determine the likelihood of the domain name purchases and renewals. For instance, the search traffic from email addresses associated with domain investors might indicate high-value domains.

Figure 4:
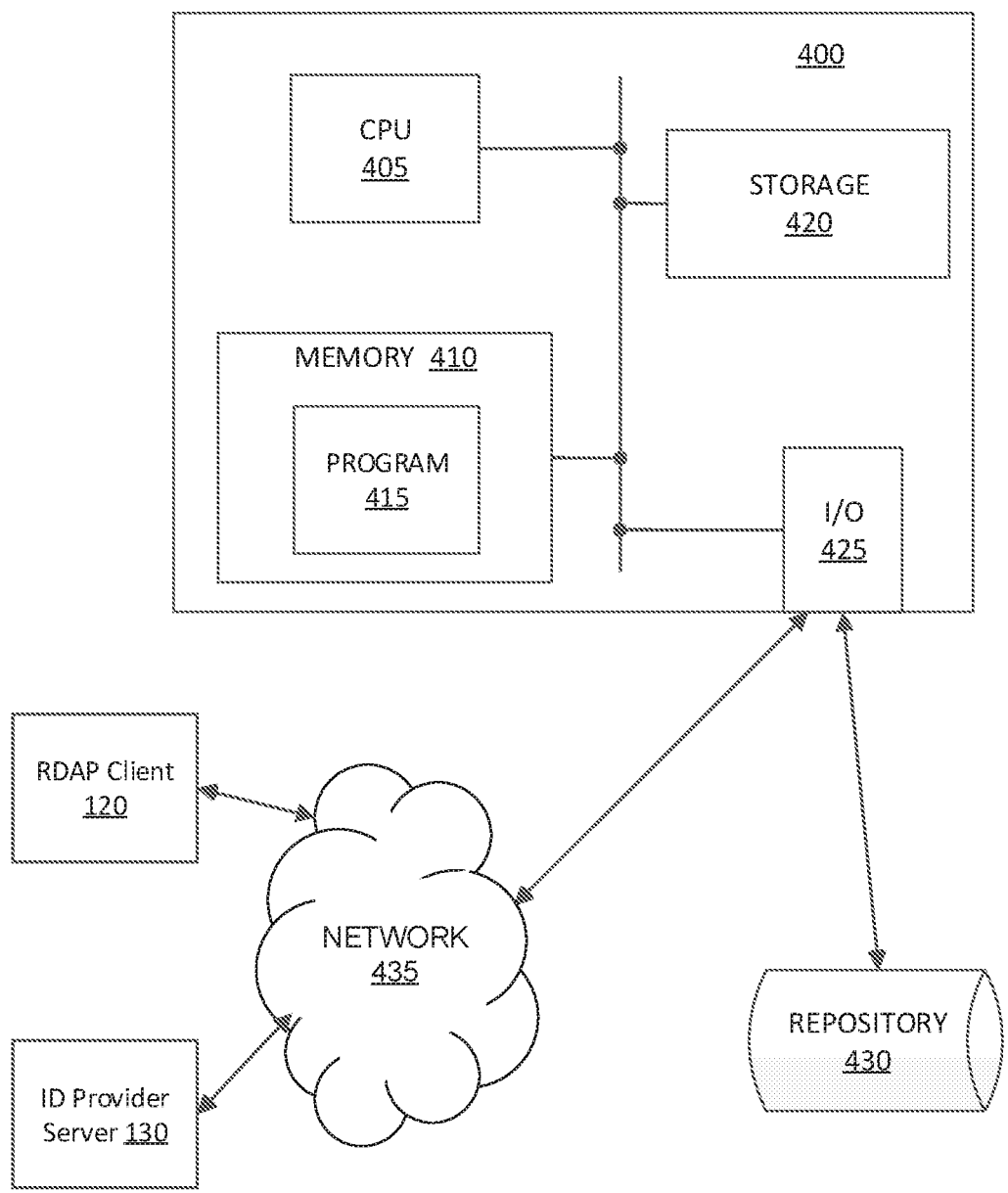
FIG. 4 is a diagram illustrating an example of a hardware computing system that may be used to implement certain disclosed embodiments.

FIG. 4 is a block diagram of an example of a computing system 400 that may be used to implement various embodiments consistent with the invention. Other components and/or arrangements may also be used. In some embodiments, the computing system 400 or two or more similar computing systems, may be used to implement, either partially or fully, the RDAP server 140 of FIG. 1 and/or the processes 200 and 330, or a combination thereof, of FIGS. 2 and 3.

The computing system 400 includes a number of components, such as a central processing unit (CPU) 405 (a.k.a. a processor or microprocessor), a memory 410, an input/output (I/O) device(s) 425, and a nonvolatile storage device 420. The system 400 can be implemented in various ways. For example, an implementation as an integrated platform (such as a server, workstation, personal computer, laptop, smart phone, etc.) may comprise the CPU 405, the memory 410, the nonvolatile storage 420, and the I/O devices 425. In such a configuration, the components 405, 410, 420, and 425 may connect and communicate through a local data bus and may access a repository 430 (implemented, for example, as a separate database system) via an external I/O connection. The I/O component(s) 425 may connect to external devices through a direct communication link (e.g., a hardwired or local Wi-Fi connection), through a network, such as a local area network (LAN) or a wide area network (WAN), and/or through other suitable connections. The system 400 may be standalone or it may be a subsystem of a larger system.

The CPU 405 may be one or more known processors or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 410 may be one or more fast storage devices (e.g., RAM) configured to store instructions and information used by the CPU 405 to perform certain functions, methods, and processes related to embodiments of the present invention. The storage 420 may be a volatile or non-volatile, magnetic, semiconductor, tape, optical, or other type of storage device or computer-readable medium, including non-volatile devices such as solid-state memory, CDs, and DVDs, meant for long-term storage.

In the illustrated embodiment, the memory 410 contains one or more program 415, which may represent one or more applications, programs or subprograms. The program 415 may be loaded into the memory 410 from the storage 420 or from a remote system (not shown), and the instructions of the program 415, when executed by the CPU 405, perform various operations, procedures, processes, or methods consistent with the present invention, which makes the system 400 into a specialized device that provides new and unconventional RDAP service functionality. Alternatively, the CPU 405 may execute one or more programs located remotely from the system 400. For example, system 400 may access one or more remote programs via the network 435 that, when executed, perform functions and processes related to embodiments of the present invention.

In one embodiment, the memory 410 may include a program 415 for providing an improved RDAP server 140. In some embodiments, the memory 410 may also include other programs or applications (not shown) that implement other methods and processes that provide ancillary functionality to the invention. For example, the memory 410 may include ancillary programs that provide an operator interface or that communicate with other RDAP servers, among other things.

The memory 410 may be also be configured with other programs (not shown) unrelated to the invention and/or an operating system (not shown) that performs several functions well known in the art when executed by the CPU 405. By way of example, the operating system may be Microsoft Windows™, Unix™, Linux™, an Apple Computers™ operating system, Personal Digital Assistant operating system such as Microsoft CE™, or other operating system. The choice of the operating system, and even to the use of an operating system, is not critical to the invention.

The I/O device(s) 425 may comprise one or more input/output devices that allow data to be received and/or transmitted by the system 400. For example, the I/O device 425 may include one or more input devices, such as a keyboard, touch screen, mouse, and the like, that enable data to be input from a user. Further, the I/O device 525 may include one or more output devices, such as a display screen, CRT monitor, LCD monitor, plasma display, printer, speaker devices, and the like, that enable data to be output or presented to a user. The I/O device 425 may also include one or more digital and/or analog communication input/output devices that allow the computing system 400 to communicate, for example, digitally, with other machines and devices, such as the RDAP client 120 and the ID Provider server 130. Other configurations and/or numbers of input and/or output devices may be incorporated into the I/O device 425.

In the embodiment shown, the system 400 is connected to a network 435 (such as the Internet, a private network, a virtual private network, or other network), which may in turn be connected to various systems and computing machines, such as the RDAP client 120, the ID Provider server 130, or other servers, personal computers, laptop computers, client devices, etc. In general, the system 400 may input data from external machines and devices and output data to external machines and devices via the network 435.

In the example shown in FIG. 4, the repository 430 is a standalone repository external to the system 400. In other embodiments, the repository 430 may be hosted by the system 400. In various embodiments, the repository 430 may manage and store data used to implement systems and methods consistent with the invention. For example, the repository 430 may manage and store data structures that contain RDAP data, user records 152, data about users and their activities, etc. For another example, the repository 430 implement the database 150.

In various implementations, the repository 430 may comprise one or more databases that store information and are accessed and/or managed through the system 400. By way of example, the repository 430 may be a set of indexed tables, or an Oracle™ database, a Sybase™ database, or other relational database. Systems and methods consistent with the invention, however, are not limited to separate databases or data structures, or even to the use of a database or data structure, and the repository 430 could be implemented in other ways.

While the teachings has been described with reference to the examples of implementations and embodiments, those skilled in the art will be able to make various modifications to the described embodiments without departing from the true spirit and scope of the invention.

The terms and descriptions used herein are set forth by way of illustration only and are not meant as limitations. Furthermore, to the extent that the terms "including", "includes", "having", "has", "with", or variants thereof are used in either the detailed description and the claims, such terms are intended to be inclusive in a manner similar to the term "comprising." As used herein, the terms "and" and "or" are not used to exclude any item listed; thus, for example, "A or B" means A alone, B alone, or both A and B. Those skilled in the art will recognize that these and other variations are possible within the spirit and scope as defined in the following claims and their equivalents.

What is claimed is:

1. A system for analyzing Registration Data Access Protocol (RDAP) requests, the system comprising:
   a memory containing instructions; and
   one or more processors, operably connected to the memory, that executes the instructions to perform operations comprising:
      receiving an RDAP search request and a security token comprising a requestor identifier that identifies an entity that made the RDAP search request and one or more representations about the entity, wherein the requestor identifier identifies a human user or an RDAP user as the entity that made the RDAP search request;

storing the RDAP search request and the security token, wherein the storing associates the RDAP search request and the security token in a file associated with the entity;

analyzing one or more of records of previous RDAP search requests that are associated with the requestor identifier and the RDAP search request based on, at least, the one or more representations about the entity to detect an abnormal activity by the entity, wherein the analyzing comprises one or more of the following:

identifying an undesirable or malicious RDAP client,
identifying an undesirable or malicious RDAP user,
analyzing an entity being searched for over time,
generating a domain interest-level indicator,
identifying a pattern related to RDAP searches that are correlated with domain name sales over a periods of time or within a locale,
correlating RDAP searches with a significant event in a domain name life cycle,
identifying an RDAP usage pattern based on a characteristic of a subject that is performing RDAP searches, or
correlating of a RDAP user characteristic and behavior relative to domain name purchases and renewals; and mitigating the abnormal activity that was detected.

2. The system of claim 1, wherein the analyzing is distributed to and performed by multiple services.

3. The system of claim 1, wherein the analyzing is performed periodically.

4. The system of claim 1, wherein the analyzing is performed continuously.

5. The system of claim 1, wherein the analyzing generates data, and the data is considered in analysis processing.

6. The system of claim 1, wherein the mitigating the abnormal activity comprises:
controlling access to an RDAP server of the entity that performed the abnormal activity that was detected.

7. The system of claim 6, wherein the controlling is performed by the RDAP server.

8. The system of claim 6, where the controlling is performed by a component that can control access to the RDAP server.

9. The system of claim 1, wherein the mitigating the abnormal activity comprises:
conventionally processing a limited number of RDAP search requests from the entity during a predetermined time period.

10. The system of claim 1, wherein mitigating the abnormal activity comprises:
ceasing to conventionally process RDAP search requests from the entity.

11. A non-transitory computer-readable media including instructions that, when executed by a processor, perform a method comprising:
receiving an RDAP search request and a security token comprising a requestor identifier that identifies an entity that made the RDAP search request and one or more representations about the entity, wherein the requestor identifier identifies a human user or an RDAP user as the entity that made the RDAP search request;

storing the RDAP search request and the security token, wherein the storing associates the RDAP search request and the security token with the entity;

analyzing one or more of records of previous RDAP search requests that are associated with the requestor identifier and the RDAP search request based on, at least, the one or more representations about the entity to detect an abnormal activity by the entity, wherein the analyzing comprises one or more of the following:

identifying an undesirable or malicious RDAP client,
identifying an undesirable or malicious RDAP user,
analyzing an entity being searched for over time,
generating a domain interest-level indicator,
identifying a pattern related to RDAP searches that are correlated with domain name sales over a periods of time or within a locale,
correlating RDAP searches with a significant event in a domain name life cycle,
identifying an RDAP usage pattern based on a characteristic of a subject that is performing RDAP searches, or
correlating of a RDAP user characteristic and behavior relative to domain name purchases and renewals; and mitigating the abnormal activity that was detected.

12. The non-transitory computer-readable media of claim 11, wherein the analyzing is distributed to and performed by multiple services.

13. The non-transitory computer-readable media of claim 11, wherein the analyzing is performed periodically.

14. The non-transitory computer-readable media of claim 11, wherein the analyzing is performed continuously.

15. The non-transitory computer-readable media of claim 11, wherein the analyzing generates data, and the data is considered in analysis processing.

16. The non-transitory computer-readable media of claim 11, wherein the mitigating the abnormal activity comprises:
controlling access to an RDAP server of the entity that performed the abnormal activity that was detected.

17. The non-transitory computer-readable media of claim 16, wherein the controlling is performed by the RDAP server.

18. The non-transitory computer-readable media of claim 16, where the controlling is performed by a component that can control access to the RDAP server.

19. The non-transitory computer-readable media of claim 16, wherein the mitigating the abnormal activity comprises:
conventionally processing a limited number of RDAP search requests from the entity during a predetermined time period.

* * * * *